Jan. 11, 1938.  H. A. BERGERT  2,104,967
APPARATUS FOR MOUNTING RACEWAY MEMBERS ON
LOCOMOTIVE CRANKPINS AND THE LIKE
Filed March 29, 1937  2 Sheets-Sheet 2
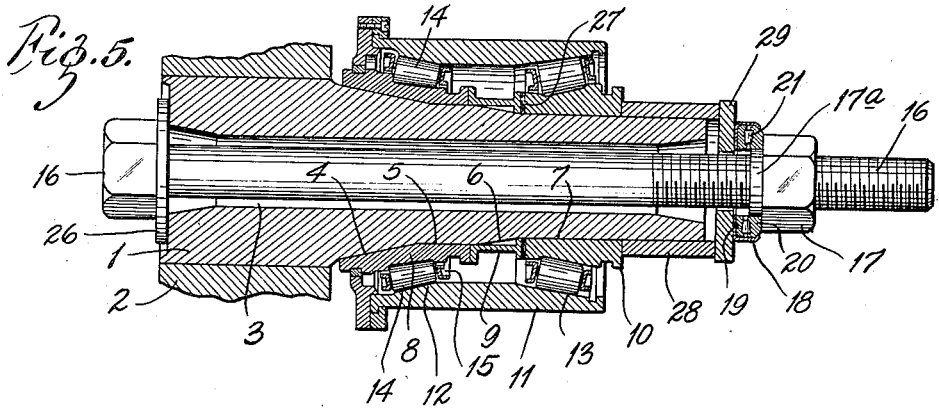
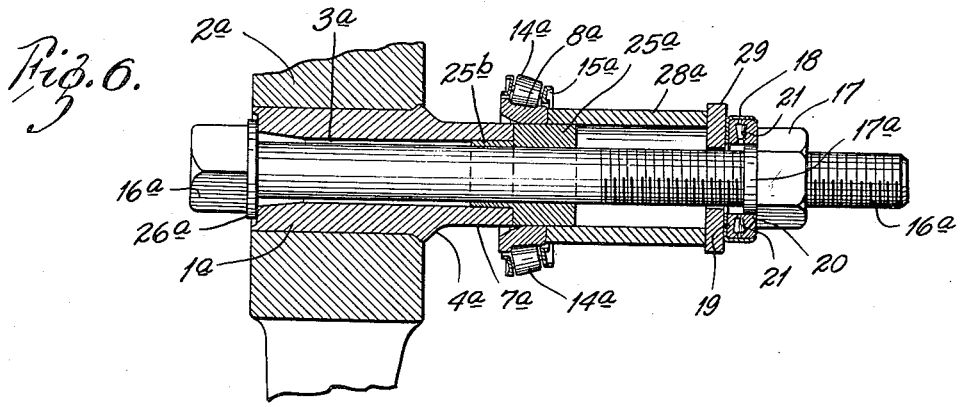
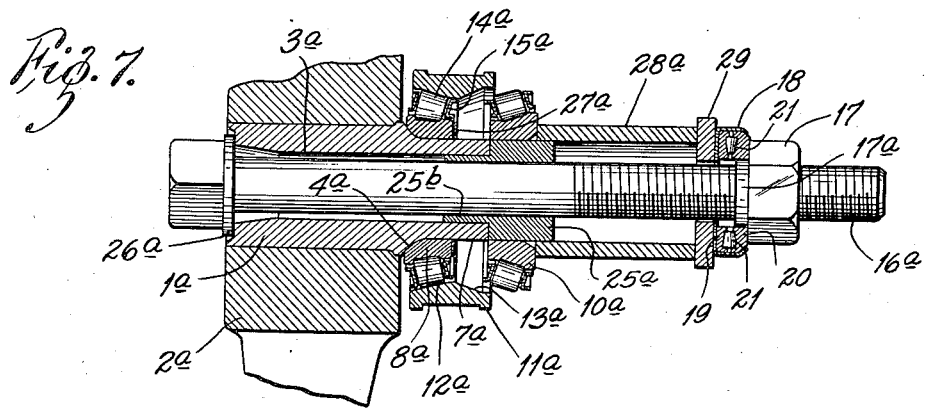
INVENTOR:
Henry A. Bergert
HIS ATTORNEYS

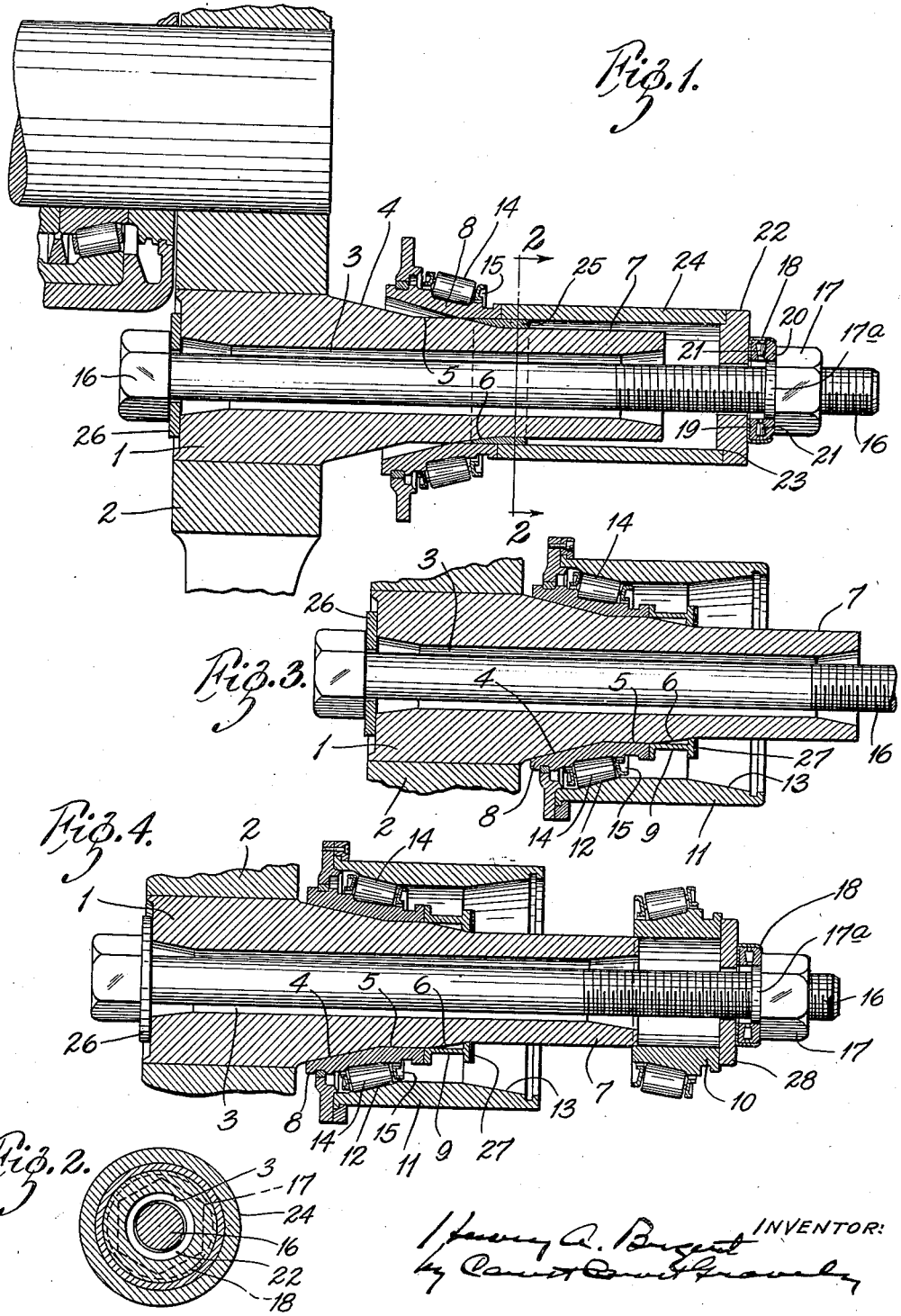

# UNITED STATES PATENT OFFICE 2,104,967

APPARATUS FOR MOUNTING RACEWAY MEMBERS ON LOCOMOTIVE CRANKPINS AND THE LIKE

Henry A. Bergert, Canton, Ohio, assignor to The Timken Roller Bearing Company, Canton, Ohio, a corporation of Ohio Application March 29, 1937, Serial No. 133,529

4 Claims. (Cl. 29—88.2)

Heretofore considerable difficulty has been found in mounting the inner raceway member of a roller bearing on a locomotive crank pin, as such raceway member must be precisely centered and alined before being subjected to the high pressure necessary to produce the required heavy press fit. Unless precisely centered and alined, such heavy pressure is liable to score the pin and improperly seat the bearing member. The principal object of the present invention is to overcome such difficulty and devise an apparatus by which the inner raceway member may be applied to the crank pin quickly and accurately and which can be operated manually and thus dispense with the heavy press heretofore required for the purpose. The invention consists in the apparatus hereinafter described.

In the accompanying drawings wherein like references refer to like parts wherever they occur, Fig. 1 is a central longitudinal sectional view showing my apparatus applied to a locomotive main crank pin in position to press the inner bearing cone and roller assembly thereon;

Fig. 2 is a cross section on the line 2—2 in Fig. 1;

Fig. 3 is a view similar to Fig. 1 showing the inner bearing cone and roller assembly and the spacer, adjusting shims and outer bearing member mounted on said crank pin;

Fig. 4 is a similar view showing the apparatus in position to press the outer bearing cone and roller assembly on the crank pin;

Fig. 5 is a similar view showing said outer bearing cone and roller assembly mounted on said crank pin; and Figs. 6 and 7 are views similar to Figs. 1 and 4, respectively, showing a modified apparatus for mounting the inner and outer bearing cone on a locomotive front crank pin.

Figs. 1 to 5 of the drawings illustrate my apparatus applied to a locomotive main crank pin 1 whose large end is mounted in a locomotive driving wheel 2. The crank pin illustrated in the drawing has an axial bore 3 extending therethrough. Its outer surface comprises an inner conical or tapering portion 4 next to the wheel, an inner cylindrical portion 5 next to said inner conical portion, an outer conical portion 6 next to said cylindrical portion and a relatively wide very slightly tapered but substantially cylindrical outer portion 7 next to said outer conical portion and extending to the end of the pin.

The bearing illustrated in the drawings comprises an annular inner raceway member 8, hereinafter called the inner cone, whose inner surface conforms in size and shape to the inner conical and cylindrical surfaces 4, 5 of the pin. Next to the inner bearing cone 8 is a flanged ring or spacer 9 and next to said spacer is another inner bearing member 10, hereinafter called the outer bearing cone, which fits tight on the outer cylindrical portion 7 of the pin. In the bearing illustrated, the outer raceway member or cup 11 has two conical raceways 12, 13 opposite the raceways of the respective cones, and between the cups and cones are series of tapered rollers 14 spaced apart by suitable cages 15.

My apparatus comprises a heavy bolt 16 of a size and length to extend through the bore of the crank pin with its head bearing against the large end of the crank pin and its threaded end extending considerably beyond the small end of such pin. On the threaded end is a nut 17 and next to the nut is a thrust bearing 18 which is supported clear of the bolt on an annular shoulder 17a on the inner end of said nut. This thrust bearing comprises two raceway members 19, 20 with a series of rollers 21 interposed between and cooperating with their raceways. The rollers 21 are preferably conical rollers with their axes substantially perpendicular to the axis of the pin. Next to the thrust bearing is a thick circular plate 22 with a hole through which the bolt 16 extends with a loose fit.

The side of the plate facing the crank pin has a circular rabbet 23 at its outer edge into which extends the end of a cylindrical sleeve 24, hereinafter called the main sleeve, whose end wall abuts against the peripheral portion of said plate with its inner surface seated on the reduced portion of the plate. Another sleeve 25 is provided, hereinafter called the pilot sleeve, whose outer surface is cylindrical and of a diameter to have an easy sliding fit inside of the main sleeve 24. The inner surface of the pilot sleeve 25 comprises a conical portion adapted to fit the outer conical surface 6 of the crank pin and also a cylindrical portion that has a sliding fit on the outer cylindrical portion 7 of the crank pin.

The operation of the apparatus above described is as follows: The main bolt 16 is inserted through the axial bore of the crank pin with a washer 26 interposed between the head of the bolt and the large end of the pin. Then the following parts are successively placed over the projecting end of the bolt, namely, the inner raceway cone 8 and the pilot sleeve 25, either together or separately, the main sleeve 24, the pressure plate 22 and the thrust bearing 18 and then the nut 17 is applied to the threaded end of the bolt. By reason of the fit of the pilot sleeve on the crank pin, it serves to center and aline the bearing cone 8 and the adjacent end of the main sleeve, the rear end of the main sleeve being centered and alined by the pilot shoulder 23 of the thrust plate 22. Therefore, when the nut 17 is turned, its pressure is transmitted through the thrust bearing, the pressure plate and the main sleeve to the inner bearing cone in such manner that said cone is correctly centered and alined at the beginning of its pressure movement, and that the entire pressure on said cone is applied parallel with the axis of the pin. The use of the thrust bearing eliminates all tendency for the bearing cup to twist in the course of mounting and also minimizes the force required to turn the nut. When the inner bearing cone is mounted, the pressure plate, the main sleeve and the pilot sleeve are removed and the cone spacer 9 and adjusting shims 27 mounted opposite the outer conical portion 6 of the crank pin and the outer bearing cone 10 is then applied over the outer end of the crank pin. As the outer end of the crank pin tapers, there is no need for a pilot sleeve in mounting it in place. When the end of the outer bearing cone is positioned over the outer end of the crank pin, a sleeve 28 is interposed between it and an annular pressure plate or washer 29 sleeved on the bolt 16 next to the thrust bearing 18, whereupon the nut 17 is turned to force said outer bearing cone into position.

Figs. 6 and 7 illustrate my apparatus applied to a locomotive front crank pin 1a whose large end is mounted in the locomotive driving wheel 2a. The crank pin 4a has an axial bore 3a extending therethrough. The outer surface of said crank pin comprises a tapering portion next to the wheel and a cylindrical portion extending to the end of the pin. The bearing comprises inner and outer bearing cones 8a and 10a, respectively, that are both mounted on the cylindrical portion 7a of the pin, with adjusting shims 27a interposed therebetween, an outer raceway member or cup 11a with two conical raceways 12a and 13a opposite the raceways of the respective cones and series of tapered rollers 14a interposed between the cups and cones and spaced apart by suitable cages 15a. With this roller bearing crank pin construction, the same parts of the apparatus are used for mounting both the inner and outer bearing cones of the bearing on the crank pin. A pilot sleeve 25a is sleeved on the main bolt 16a of the apparatus in abutting relation to the outer end of the crank pin and has a reduced axial extension that fits within the bore 3a of said pin. The large outer end portion of this pilot sleeve, which has the same outside diameter as the cylindrical outer end portion of the crank pin, serves to center and aline the bearing cones with the crank pin and as a support and pilot for the inner end of a sleeve 28a that is interposed between the annular pressure plate or washer 29 sleeved on the bolt next to the thrust bearing 18. With this arrangement, when the nut 17 is tightened on the bolt, its pressure is transmitted through the thrust bearing, pressure plate and sleeve to the bearing cone, thereby forcing said cone into position on the crank pin.

While the apparatus hereinbefore described is especially valuable in mounting bearing cones on locomotive crank pins, it is also valuable in mounting heavy bushings, sleeves and the like on other hollow shafts or supports where a tight fit is required, as it greatly simplifies the centering and alinement of the parts and dispenses with the heavy press heretofore required for such work.

What I claim is:

1. Apparatus for mounting roller bearings on hollow crank pins and the like, said apparatus comprising a threaded and headed through-bolt adapted to extend through said pin and having a nut on its projecting portion, a pilot sleeve whose inner surface has a sliding fit on said pin and whose outer surface is of a size to permit the inner raceway member of the bearing to slide on it, a pressure sleeve slidable on said pilot sleeve, and means for transmitting pressure from said nut to said sleeve.

2. Apparatus for mounting roller bearings on hollow crank pins and the like, said apparatus comprising a threaded and headed through bolt adapted to extend through said pin and having a nut thereon, a pilot sleeve whose inner surface has a sliding fit on said pin and whose outer surface is of a size to make a sliding fit for the inner raceway member of the bearing, a pressure sleeve slidable on said pilot sleeve, a plate bearing against the end of said pressure sleeve and a thrust roller bearing next to said nut.

3. Apparatus for mounting roller bearings on hollow crank pins and the like, said apparatus comprising a threaded and headed through-bolt adapted to extend through said pin and having a nut on its projecting portion, a pilot sleeve whose inner surface has a sliding fit on said pin and whose outer surface is of a size to permit the inner raceway member of the bearing to slide on it, a pressure sleeve slidable on said pilot sleeve, and means for transmitting pressure from said nut to said sleeve, said means including a thrust roller bearing next to said nut.

4. Apparatus for mounting roller bearings on hollow crank pins and the like, said apparatus comprising a threaded and headed through-bolt adapted to extend through said pin, a pilot sleeve whose inner surface has a sliding fit on said pin and whose outer surface is of a size to permit the inner raceway member of the bearing to slide on it, a pressure sleeve slidable on said pilot sleeve, a plate having a pilot extending into the end of said pressure sleeve, a washer next to said plate, a thrust roller bearing next to said washer and a nut on said bolt next to said thrust member.

HENRY A. BERGERT.